(12) United States Patent
Luberto et al.

(10) Patent No.: US 10,860,275 B1
(45) Date of Patent: Dec. 8, 2020

(54) MODULAR DISPLAY AND DISPENSING SYSTEM

(71) Applicant: Henschel-Steinau, Inc., Allendale, NJ (US)

(72) Inventors: Michael D. Luberto, River Vale, NJ (US); Michael D. DeSena, West Caldwell, NJ (US); Getachew Kassa, West Orange, NJ (US)

(73) Assignee: Henschel-Steinau, Inc., Allendale, NJ (US)

( * ) Notice: Subject to any disclaimer, the term of this patent is extended or adjusted under 35 U.S.C. 154(b) by 244 days.

(21) Appl. No.: 16/225,197

(22) Filed: Dec. 19, 2018

(51) Int. Cl.
| | |
|---|---|
| *A47F 3/00* | (2006.01) |
| *A47F 7/28* | (2006.01) |
| *B65D 21/02* | (2006.01) |
| *A47F 11/10* | (2006.01) |
| *F21W 131/405* | (2006.01) |
| *G06F 3/14* | (2006.01) |
| *G09G 3/32* | (2016.01) |
| *G06F 1/16* | (2006.01) |
| *H01R 12/70* | (2011.01) |
| *H01L 27/32* | (2006.01) |

(52) U.S. Cl.
CPC ............ *G06F 3/1446* (2013.01); *A47F 3/001* (2013.01); *A47F 7/281* (2013.01); *A47F 11/10* (2013.01); *B65D 21/0215* (2013.01); *G06F 1/1601* (2013.01); *G09G 3/32* (2013.01); *H01L 27/3241* (2013.01); *H01R 12/7076* (2013.01); *F21W 2131/405* (2013.01)

(58) Field of Classification Search
CPC .......... A47F 11/10; A47F 3/001; A47F 7/281; B65D 21/0215; F21W 2131/405; G09G 3/32; H01L 27/3241; H01R 12/7076
See application file for complete search history.

(56) References Cited

U.S. PATENT DOCUMENTS

| | | |
|---|---|---|
| 3,598,464 A | 8/1971 | Moroziuk |
| 3,722,745 A | 3/1973 | Gushi et al. |
| 5,205,638 A | 4/1993 | Squitieri |
| 5,301,834 A | 4/1994 | Lee |

(Continued)

FOREIGN PATENT DOCUMENTS

| | | |
|---|---|---|
| CA | 2522369 A1 | 4/2006 |
| FR | 2912626 A1 | 8/2008 |

*Primary Examiner* — Alexander K Garlen
(74) *Attorney, Agent, or Firm* — Arthur Jacob

(57) ABSTRACT

A modular display and dispensing assembly and method distribute low-voltage power to a low-voltage electrical display feature at each of a plurality of display and dispensing modules arranged in a matrix and placed upon a substrate for display of items to be dispensed. A sub-base is secured to the substrate at a desired, prescribed display and dispensing location, while a main base is selectively coupled to and uncoupled from the sub-base. A plurality of electrical contact points in both the sub-base and main base enables the sub-base to remain securely mounted upon the substrate and connected to a source of low-voltage power while allowing selective uncoupling of the main base from the sub-base for ready removal of the matrix from the substrate for safe storage, without disturbing the secure placement of the sub-base at the desired prescribed display and dispensing location or the connection to the source of low-voltage power.

20 Claims, 4 Drawing Sheets

(56) References Cited

U.S. PATENT DOCUMENTS

| | | | |
|---|---|---|---|
| 5,695,261 A | 12/1997 | Slesinger et al. | |
| 8,646,935 B2 | 2/2014 | Karan | |
| 9,150,329 B2 | 10/2015 | Watson | |
| 9,437,049 B2* | 9/2016 | Barrett | E05B 65/0075 |
| 9,532,661 B2* | 1/2017 | Jafa | F25D 23/06 |
| 9,542,780 B1 | 1/2017 | Watson | |
| 10,134,244 B1* | 11/2018 | Holbrook | G07F 17/42 |
| 2003/0156501 A1* | 8/2003 | Spindel | G06Q 10/087 369/1 |
| 2006/0016826 A1 | 1/2006 | Jensen | |
| 2007/0080175 A1* | 4/2007 | Petersen | A47F 1/02 222/185.1 |
| 2008/0277407 A1* | 11/2008 | Leonetti | A47F 1/082 221/22 |
| 2015/0001241 A1* | 1/2015 | Yeh | G07F 11/44 221/124 |
| 2018/0127150 A1* | 5/2018 | Adanur | A47B 87/0292 |
| 2018/0190073 A1* | 7/2018 | Ghia | G07F 17/42 |

* cited by examiner

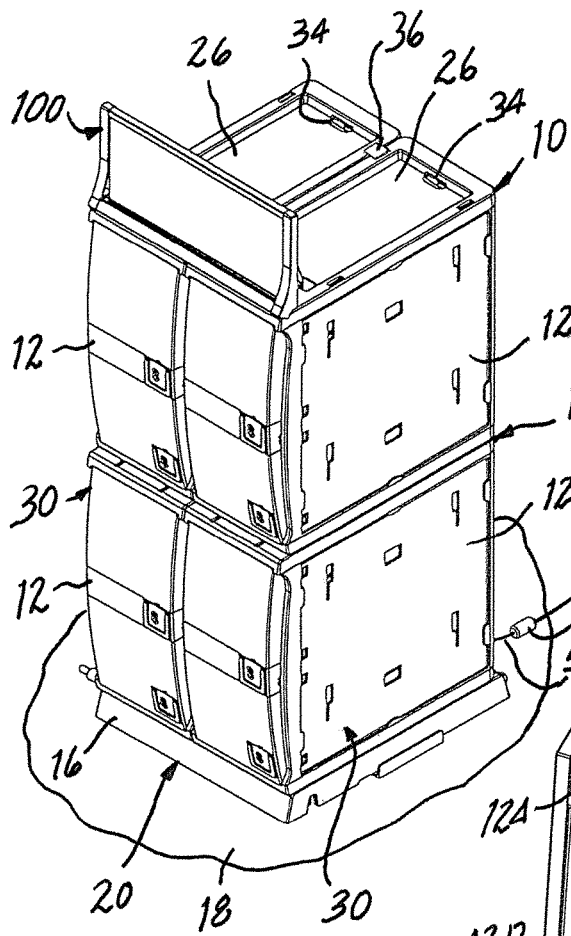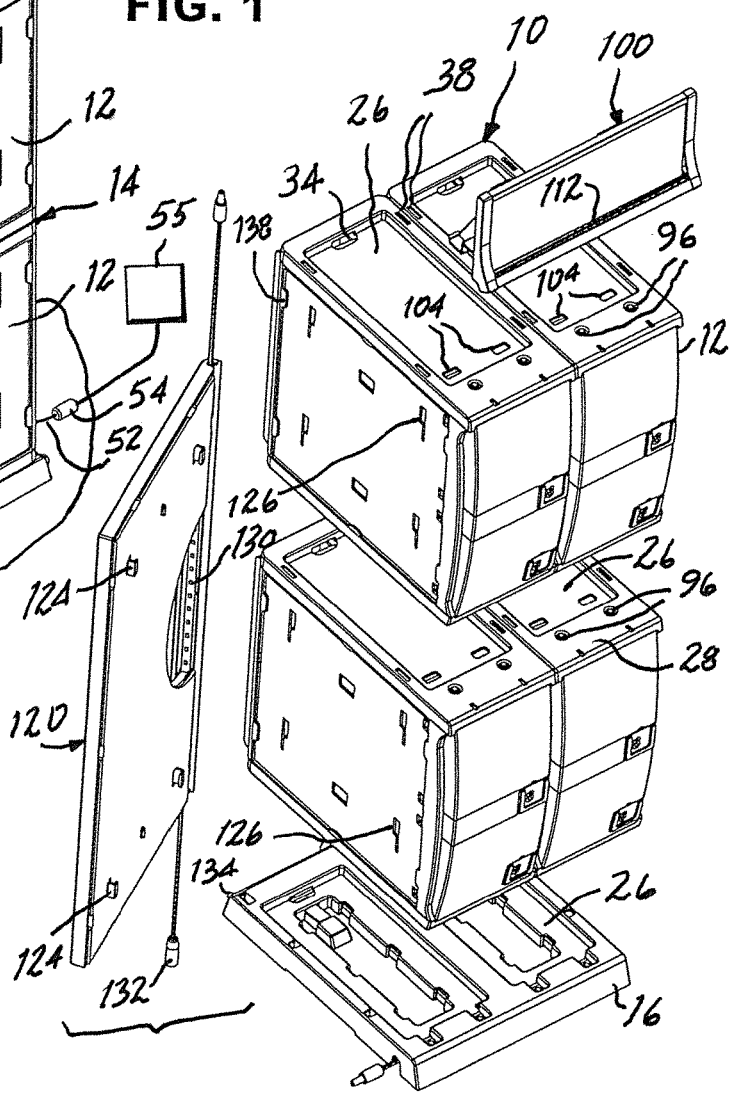
FIG. 1
FIG. 2

MODULAR DISPLAY AND DISPENSING SYSTEM

The present invention relates generally to the display and dispensing of a variety of items at a sales counter or the like and pertains, more specifically, to the presentation of a selected variety of items displayed at a particular location such as, for example, a sales counter where a customer can view and select available items for retrieval by a sales clerk, with increased ease and convenience.

Many items are offered for sale at display locations on counters and similar sales points at retail outlets where a customer can select a particular item and a sales clerk retrieves the chosen item from the display and delivers the item to the customer. For example, lottery tickets are sold in that manner, requiring careful control over inventory and sales. At the same time, a wide variety of items are made available in a limited space, requiring a compact display. Additionally, higher valued items, such as lottery tickets, must be protected against theft while still offered in an aesthetically attractive display.

Recognizing the above factors, as well as additional requirements, the present invention attains several objects and advantages, some of which are summarized as follows: Makes available at counters and similar retail sales locations a compact and versatile display of items for selection by a purchaser and delivery to the purchaser by a sales clerk; facilitates the assembly of a selected number of display and dispensing modules into a matrix of selected modules readily placed at a sales location; enables creation of an assembly of selected display and dispensing modules with low-voltage power distributed throughout the assembly for use in enhancing an assembled display; facilitates connection and disconnection of the assembly to and from a source of low-voltage power for ease of both set-up for use and removal for secure storage of the assembled display and dispensing modules and the items contained within the modules; provides aesthetically pleasing illumination throughout a matrix of assembled display and dispensing modules; facilitates distribution of low-voltage electrical power from a single source to each one of a plurality of display and dispensing modules assembled within a matrix of such modules; provides a high degree of versatility in creating and presenting a matrix of a selected number of assembled illuminated display and dispensing modules; makes available low-voltage electrical power for use at each module of a matrix of a selected number of assembled modules; provides an assembly of display and dispensing modules capable of exemplary performance over an extended service life.

The above objects and advantages, as well as further objects and advantages, are attained by the present invention which may be described briefly as a modular display and dispensing assembly in which low-voltage power is distributed from an external source of low-voltage power to a low-voltage electrical display feature at each of a plurality of display and dispensing modules assembled with one-another and arranged in a matrix upon a substrate for display of items to be dispensed, the modular display and dispensing assembly comprising: a first basal construct configured for being securely mounted to the substrate at a prescribed display and dispensing location on the substrate; first electrical contact points placed in a supply pattern within the first basal construct; a connector circuit for connecting the first electrical contact points to the source of low-voltage power; the plurality of display and dispensing modules being constructed and configured for selective arrangement in juxtaposition with one-another in the matrix of display and dispensing modules; a second basal construct configured for selective coupling to and uncoupling from the first basal construct, the second basal construct being configured for receiving the display and dispensing modules arranged in the matrix; a plurality of second electrical contact points placed in a distribution pattern within the second basal construct; a second connector circuit for connecting the distribution pattern of second electrical contact points to the supply pattern of first electrical contact points upon coupling the second basal construct with the first basal construct; third electrical contact points placed in a reception pattern in each display and dispensing module for contacting corresponding second electrical contact points of the distribution pattern upon arranging the matrix of display and dispensing modules upon the second basal construct; further electrical contact points placed in a further distribution pattern in each display and dispensing module; a further connector circuit in each display and dispensing module, each further connector circuit connecting the further electrical contact points with corresponding third electrical contact points; and at least one low-voltage electrical display feature carried by each display and dispensing module and connected to the further connector circuit, whereby selective coupling of the first basal construct with the second basal construct establishes distribution of low-voltage power to each display and dispensing module, while selective uncoupling of the second basal construct from the first basal construct facilitates ready removal of the matrix of display and dispensing modules received within the second basal construct from the substrate without disturbing the secure mounting of the first basal construct at the prescribed display and dispensing location, or a connection between the connector circuit and the source of low-voltage power.

In addition, the present invention provides a method for distributing low-voltage power from a source of low-voltage power to a low-voltage electrical display feature at each of a plurality of display and dispensing modules assembled with one-another and arranged in a matrix upon a substrate for display of items to be dispensed, the method comprising: mounting a first basal construct secured to the substrate at a prescribed display and dispensing the location on the substrate; placing first electrical contact points in a supply pattern within the first basal construct; connecting the first electrical contact points to a source of low-voltage power; arranging a plurality of display and dispensing modules in juxtaposition with one-another in the matrix of display and dispensing modules; configuring a second basal construct for selective coupling to the first basal construct; receiving the display and dispensing modules within the second basal construct, arranged in the matrix; placing a plurality of second electrical contact points in a distribution pattern within the second basal construct; connecting the distribution pattern of second electrical contact points to the supply pattern of first electrical contact points upon coupling the second basal construct with the first basal construct; placing third electrical contact points in a reception pattern in each display and dispensing module for contacting corresponding second electrical contact points upon arranging the matrix of display and dispensing modules upon the second basal construct; placing further electrical contact points in a further distribution pattern in each display and dispensing module; connecting the further electrical contact points with corresponding third electrical contact points in each display and dispensing module; and connecting at least one low-voltage electrical display feature carried by each display and dispensing module to the further connector circuit, whereby selective coupling of the first basal construct with the second basal construct establishes distribution of low-voltage power to each display and dispensing module, while selective uncoupling of the second basal construct from the first basal construct facilitates ready removal of the matrix of display and dispensing modules received in the second basal construct from the substrate without disturbing the secure mounting of the first basal construct at the prescribed display and dispensing location, or a connection between the connector circuit and the source of low-voltage power.

The invention will be understood more fully, while still further objects and advantages will become apparent, in the following detailed description of preferred embodiments of the invention illustrated in the accompanying drawing, in which:

FIG. 1 is a front, top, and right side pictorial view of a matrix of modules in a modular display and dispensing assembly constructed in accordance with the present invention;

FIG. 2 is a front, top, and left side exploded pictorial view of the matrix of FIG. 1, with added component parts;

Figures 3, 4:
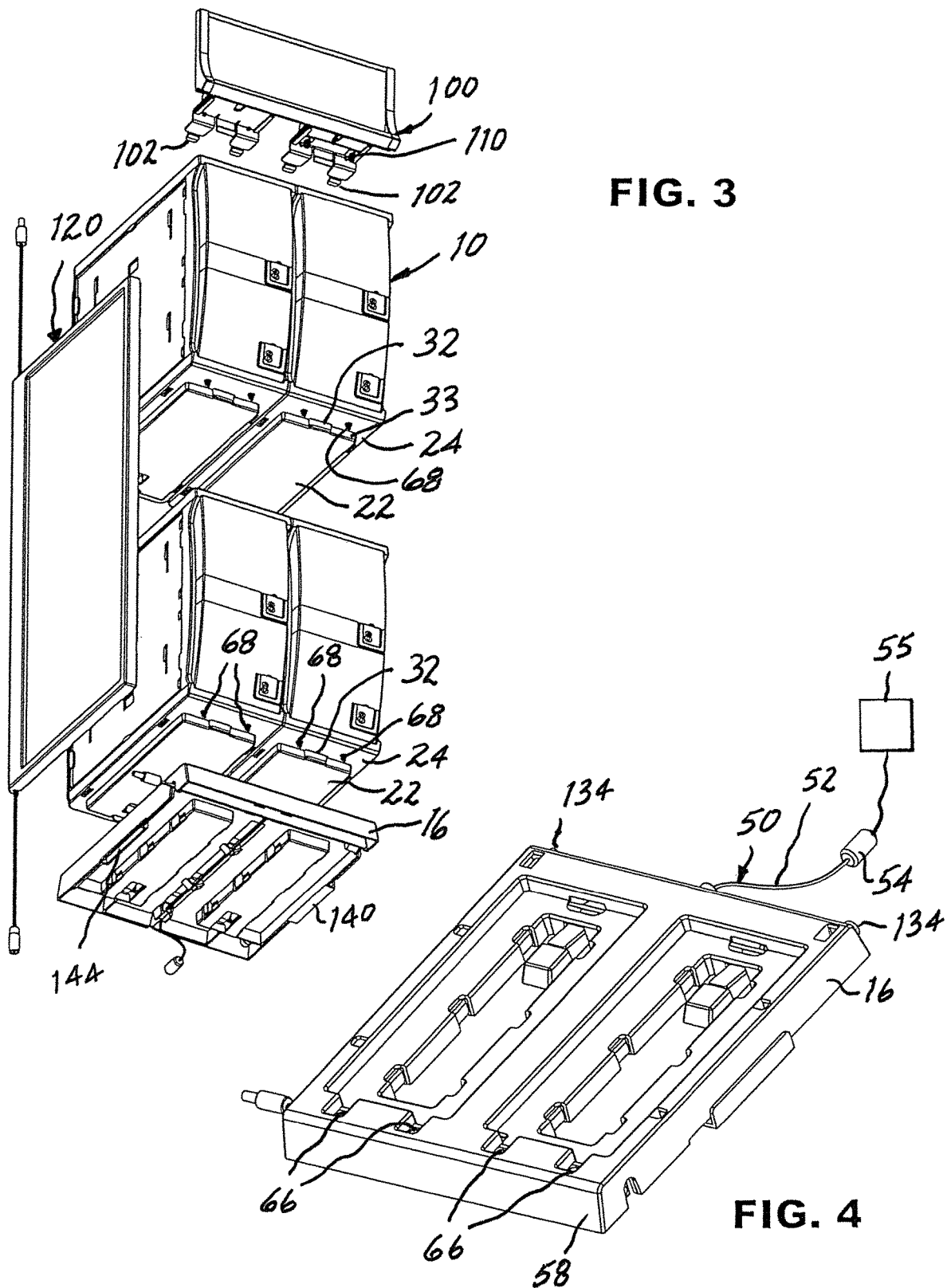
FIG. 3 is a front, bottom, and left side exploded pictorial view of the matrix and component parts shown in FIG. 2.
FIG. 4 is a front, top and right side pictorial view of certain assembled component parts of the modular display and dispensing assembly of FIG. 1.

Referring now to the drawing, a modular display and dispensing assembly constructed in accordance with the present invention is shown at 10 and is seen to include a plurality of display and dispensing modules 12 assembled with one-another and arranged in a matrix 14 upon a base 16 supported on a substrate shown in the form of a counter 18 and placed at a prescribed display and dispensing location, shown in the form of a sales location 20 within a retail sales venue. In the illustrated embodiment, the matrix 14 is comprised of four modules 12 which have been selected and arranged in the matrix 14. To that end, each module 12 includes a foot 22 depending downwardly from the bottom 24 of the module 12 and a recess 26 at the top 28 of each module 12. Each foot 22 is configured complementary to each recess 26 so that a foot 22 of one module 12 is inserted into a complementary recess 26 of another module 12 to establish an integrated stack 30 of modules 12. In the exemplary matrix 14, each stack 30 includes two selected modules 12 and the matrix 14 includes two stacks 30 arranged side-by-side and placed in common base 16. Base 16 includes further recesses 26 for the reception of corresponding feet 22 of the bottom-most modules 12 of the stacks 30. Each foot 22 includes a projection 32 at each end 33 of foot 22, each of which projections 32 enters a complementary opening 34 juxtaposed with a corresponding recess 26 to hold a module 12 snapped into place, assembled with another module 12 or, in the case of a lowermost module 12, to hold a stack 30 snapped into place in base 16. In addition, one or more clips 36 are inserted, each in complementary slots 38 at the top of side-by-side stacks 30 to stabilize the stacks 30 in place, connected to base 16.

While in the assembly 10 illustrated herein, matrix 14 includes two stacks 30 with two modules 12 in each stack 30, the configuration of each module 12 and base 16 enables the choice of other numbers of modules 12 and stacks 30 selected for inclusion within an assembly constructed in accordance with the present invention.

In the illustrated embodiment, modules 12 are constructed for the display and dispensing of lottery tickets which, because of their potentially high value, are dispensed by a sales clerk (not shown) upon selection by a purchaser (not shown). In view of the wide variety of lottery tickets ordinarily offered for sale at a single location, sales locations for lottery tickets usually require a considerable number of display and dispensing modules 12. Accordingly, it becomes important for a sales location at which lottery tickets are sold, such as sales location 20, to be able to accommodate a concomitant wide variety. Because that variety might vary in number from location to location, the modular system described herein provides a very important advantage in accommodating the number of lottery tickets in a particular variety encountered at any specific location. In the present embodiment, each individual module 12 accommodates two varieties of lottery tickets, each variety being dispensed from a separate drawer 40 accessible to a sales clerk from behind a module 12. At the request of a purchaser, the sales clerk will withdraw a lottery ticket 42 through a slot 43 accessible at rear R of housing 41 while for security the drawer 40, shown open in FIG. 7 for illustrative purposes, remains closed and locked within housing 41. The purchaser will make a selection based upon viewing a lottery ticket identification card 44 displayed behind a transparent window 46 placed at the front F of a module 12 and corresponding to lottery tickets 42 in a supply of lottery tickets 42 within drawer 40 located behind window 46. The supply of lottery tickets 42 in a drawer 40 is replenished readily by unlocking and opening the drawer 40 for convenient restocking.

Figure 5:
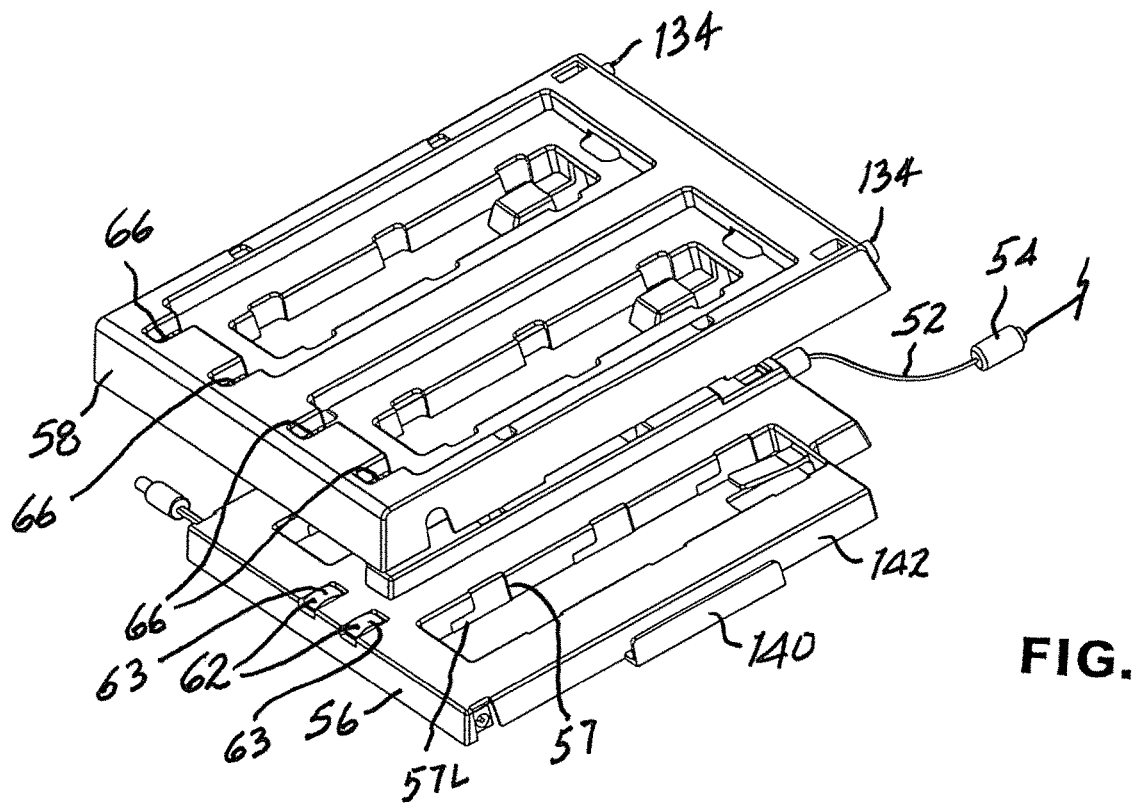
FIG. 5 is a front, top and right side exploded pictorial view of the component parts shown in FIG. 4.
Figure 6:
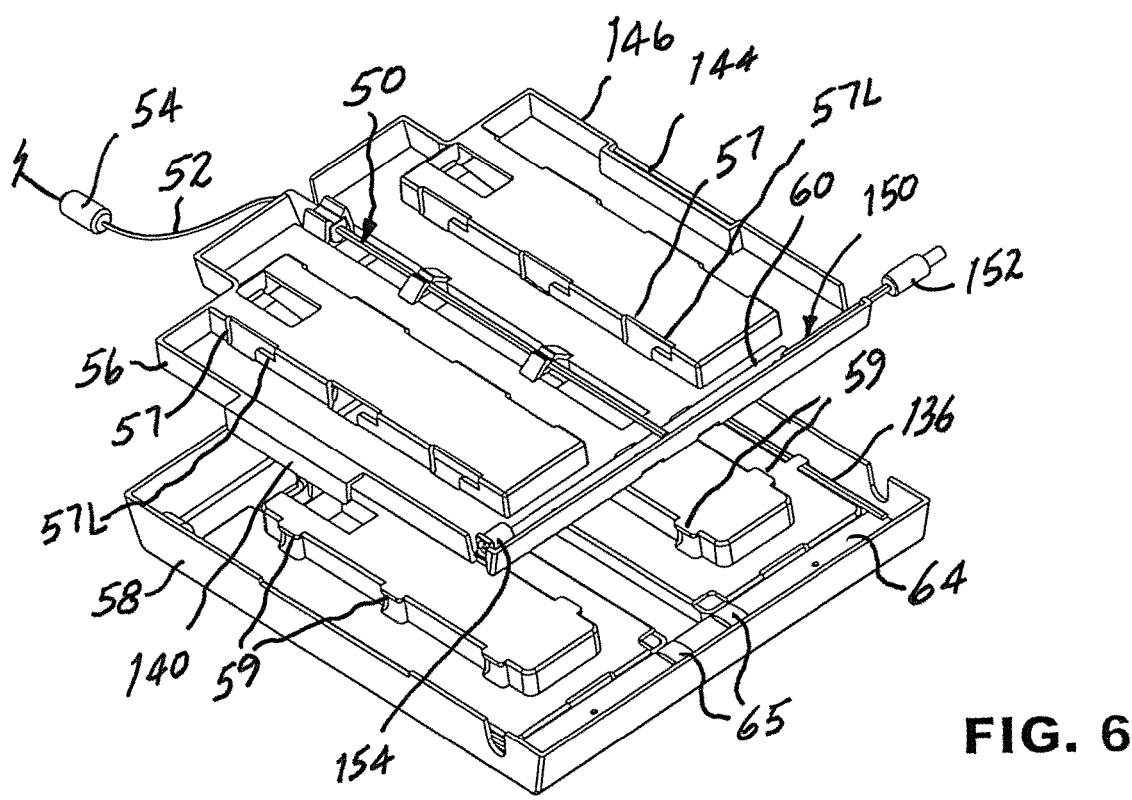
FIG. 6 is a front, bottom and left side exploded pictorial view of the component parts shown in FIG. 4.

In order to assist a purchaser of a lottery ticket 42, each identification card 44 is illuminated by a series of lighting elements powered by low-voltage electrical power distributed, by a power distribution system 50, throughout assembly 10, to lighting elements positioned to illuminate each lottery ticket identification card 44 displayed behind a corresponding window 46. With reference now to FIGS. 4 through 6, a line cord 52 is connected through a connector 54 to a source 55 of low-voltage electrical power and extends into base 16. Base 16 is comprised of a first basal construct shown in the form of a sub-base 56, and a second basal construct shown in the form of a main base 58. The sub-base 56 is configured for being mounted to the counter 18, affixed securely, as by double-sided adhesive tape (not shown), at the prescribed display and dispensing location on the counter 18, as depicted in FIG. 1 by sales location 20. The main base 58 is configured for selective coupling to and uncoupling from sub-base 56 by being fitted over sub-base 56, as seen in FIGS. 4 and 5. To that end, sub-base 56 includes a plurality of L-shaped slots 57 and main base 58 includes a corresponding plurality of tabs 59. Main base 58 is coupled to sub-base 56 by aligning each tab 59 with a corresponding slot 57, lowering main base 58 over sub-base 56 to seat main base 58 upon sub-base 56, and then sliding main base 58 relative to sub-base 56 to engage each tab 59 with a lower leg 57L of each slot 57 to secure main base 58 to sub-base 56.

As best seen in FIG. 6, line cord 52 is routed to a printed circuit board 60 wherein circuitry directs power to electrical contacts 62 carried by printed circuit board 60 and providing first contact points 63 placed in a supply pattern. Upon coupling main base 58 to sub-base 56, circuitry in a second printed circuit board 64 receives power from first contact points 63 of electrical contacts 62 through electrical contacts 65 and transfers power to electrical contact points 66 made available in a distribution pattern along main base 58. Each module 12 carries electrical contacts in the form of electrical contact points 68 placed in a reception pattern in each module 12 for contacting corresponding electrical contact points 66 upon arranging the matrix 14 of modules 12 upon the main base 58.

Figure 7:
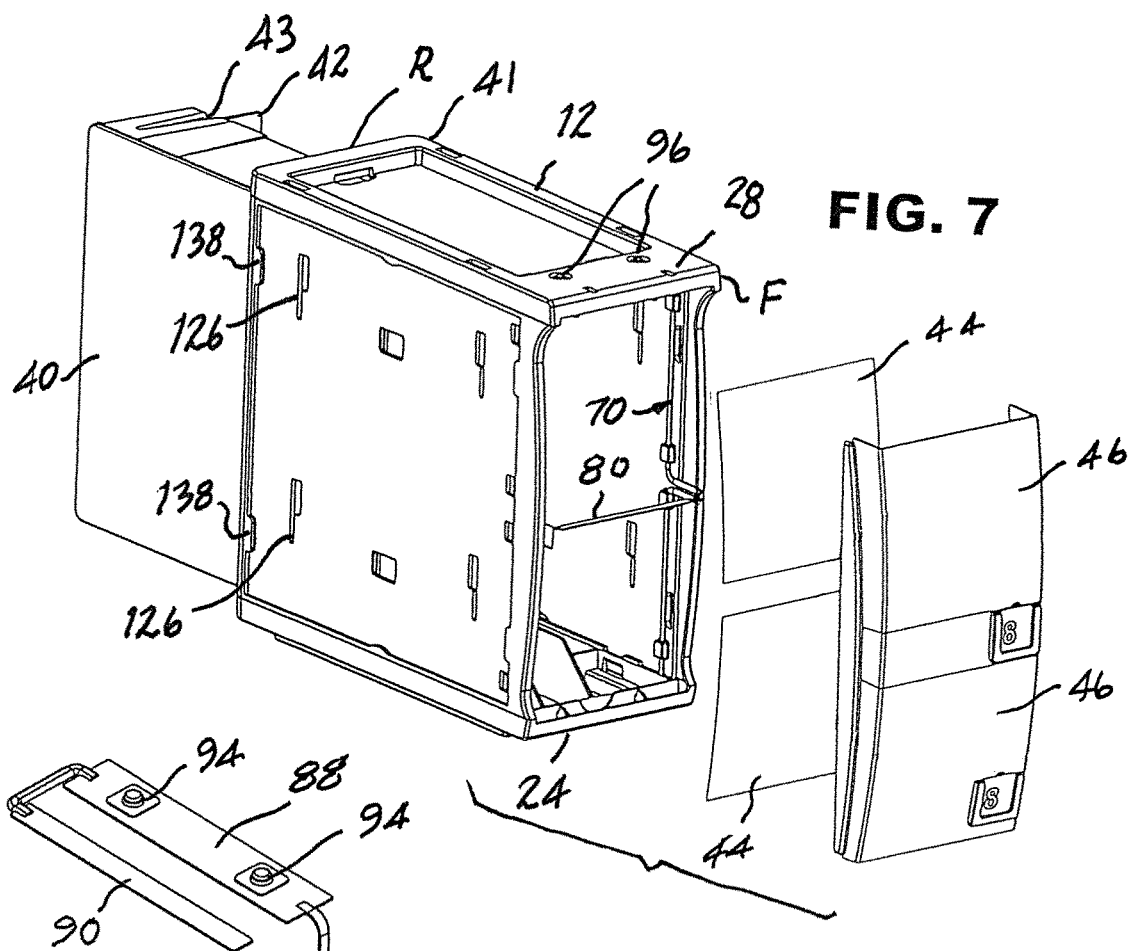
FIG. 7 is a front, top and left side exploded pictorial view of a module of the matrix shown in FIG. 1.
Figure 8:
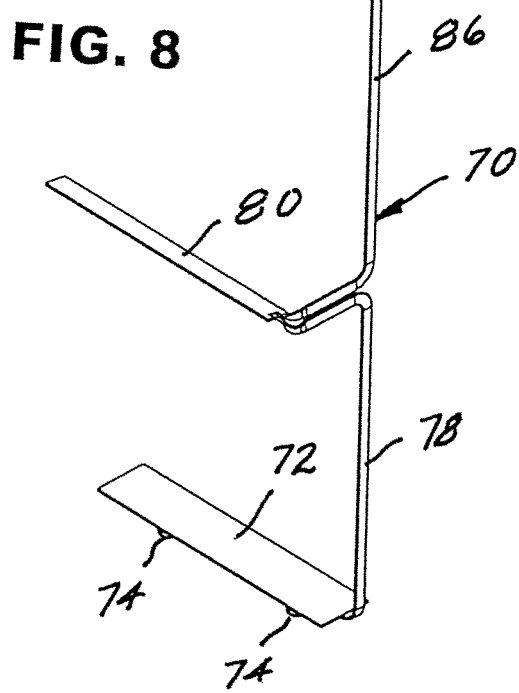
FIG. 8 is a front, top and left side pictorial view of a component part of the module depicted in FIG. 7.
Figure 9:
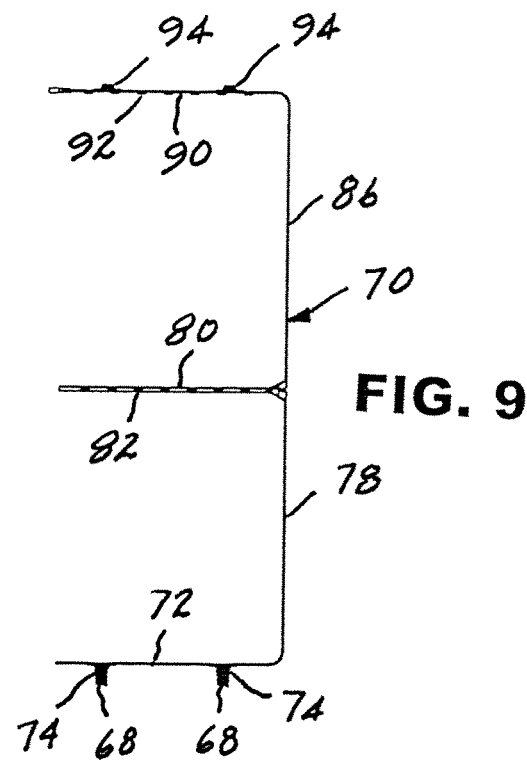
FIG. 9 is a side elevational view of a component part depicted in FIG. 8.

With reference to FIGS. 7 through 9, each module 12 includes a connector circuit in the form of a wire harness 70 having a printed circuit board 72 juxtaposed with the bottom 24 of a corresponding module 12 and carrying electrical contacts 74 providing electrical contact points 68 placed in the reception pattern at the bottom of each module 12. Circuit board 72 is connected by lead wires 78 to an LED strip 80 located immediately above lower window 46 of corresponding module 12 for powering LEDs 82 carried by LED strip 80 and directed toward lottery ticket identification card 44 behind lower window 46 to illuminate lottery ticket identification card 44 placed behind lower window 46. Further lead wires 86 conduct power to a further printed circuit board 88 which directs power to a further LED strip 90 located immediately above upper window 46 of corresponding module 12 for powering LEDs 92 carried by LED strip 90 and directed toward lottery ticket identification card 44 placed behind upper window 46 to illuminate lottery ticket identification card 44 placed behind upper window 46. Printed circuit board 88 carries electrical contacts 94 positioned for providing low-voltage electrical power to contact points 96 placed in a distribution pattern at the top 28 of module 12. In this manner low-voltage electrical power is distributed throughout modules 12 within matrix 14 for providing illumination to each lottery ticket identification card 44 placed behind each window 46 of the matrix 14. While in the present embodiment LEDs are provided as an illustrative example of low-voltage electrical display features, it is to be understood that other low-voltage electrical display features can be distributed throughout matrix 14 of modules 12 utilizing the herein described power distribution system 50.

In view of the high potential value of lottery tickets, it is advisable, and imperative, to secure available lottery tickets against theft or other loss when not being monitored by sales personnel during normal business hours. Accordingly, it has become routine to remove lottery tickets to a secure location during a period when sales are not being conducted. In order to facilitate such removal without the necessity for inconvenient disconnection from a power source, modular display and dispensing assembly 10 enables a proprietor merely to lift matrix 14 of modules 12 and main base 58 as a unit by uncoupling main base 58 from sub-base 56 and thereby removing matrix 14 of modules 12, and lottery tickets contained therein, to a secure location, while maintaining the integrity of the assembled main base 58 and stacks 30 of matrix 14. Upon return of the matrix 14 of modules 12 and main base 58 from the safe location to the sale location 20, main base 58 merely is coupled, once again, with sub-base 56 and low-voltage electrical power once again is distributed to all modules 12 within matrix 14, all without disturbing the secure affixation of sub-base 56 to counter 18, or the connection between line cord 52 and source 55 of low-voltage electrical power.

The system 50 for distributing low-voltage electrical power throughout each matrix 14 of modules 12 enables the use of aesthetically enhancing components such as, for example, a header 100 for displaying information pertaining to items to be dispensed from modules 12. Header 100 includes tabs 102 receivable within complementary slots 104 in corresponding modules 12 for mounting the header 100 in place at the top of the matrix 14. A header connector circuit includes an arrangement wherein electrical contact points 10 carried by header 100 are provided in a reception pattern for engaging corresponding electrical contact points 96 carried by a module 12 for powering illumination, such as a strip of LEDs 112, or another low-voltage electrical display feature provided in header 100.

Likewise, a side panel 120 may be mounted at each side of the joined stacks 30, held in place by keys 124 located on a side panel 120 for engaging corresponding key holes 126 placed in each module 12. Each side panel 120 carries a low-voltage electrical display feature, such as illumination provided by LEDs 130, powered through a side panel connector circuit including electrical connectors 132 configured for engagement with corresponding complementary electrical connectors 134 connected by leads 136 to line cord 52, through printed circuit board 64. In addition, a plurality of fingers 138 are spaced apart around the periphery of each side of a module 12 for alternately capturing a conventional decorative or information bearing card (not shown) for viewing at an exposed side of a module 12.

Where the demand for a variety of lottery tickets 42 at a particular sales location is greater than the variety made available in a single assembly 10, multiple assemblies 10 can be arranged side-by-side to accommodate the number of different lottery tickets 42 made available at that particular sales location. In that manner, the size and weight of each matrix 14 is maintained at a manageable level, facilitating removal of each matrix 14 for safe storage and subsequent replacement for use, as described above in connection with managing a single assembly 10. To that end, sub-base 56 includes a tongue 140 integral with sub-base 56 along one side 142 of sub-base 56, and a complementary groove 144 along opposite side 146 such that upon insertion of a tongue 140 of one sub-base 56 into a groove 144 of an adjacent sub-base 56 (not shown), a number of assemblies 10 can be joined together mechanically at an expanded sales location (not shown) in order to accommodate the demand for lottery tickets 42 at that sales location. Sub-base 56 is provided with an auxiliary circuit 150 powered by line cord 52 and including a first electrical connector 152 and a second electrical connector 154, both connected to line cord 52 through circuitry provided by printed circuit board 60. Thus, low-voltage electrical power can be distributed to adjacent, mechanically joined together assemblies 10 at a particular, expanded sales location.

It will be seen that the present invention attains all of the objects and advantages summarized above, namely: Makes available at counters and similar retail sales locations a compact and versatile display of items for selection by a purchaser and delivery to the purchaser by a sales clerk; facilitates the assembly of a selected number of display and dispensing modules into a matrix of selected modules readily placed at a sales location; enables creation of an assembly of selected display and dispensing modules with low-voltage power distributed throughout the assembly for use in enhancing an assembled display; facilitates connection and disconnection of the assembly to and from a source of low-voltage power for ease of both set-up for use and removal for secure storage of the assembled display and dispensing modules and the items contained within the modules; provides aesthetically pleasing illumination throughout a matrix of assembled display and dispensing modules; facilitates distribution of low-voltage electrical power from a single source to each one of a plurality of display and dispensing modules assembled within a matrix of such modules; provides a high degree of versatility in creating and presenting a matrix of a selected number of assembled illuminated display and dispensing modules; makes available low-voltage electrical power for use at each module of a matrix of a selected number of assembled modules; provides an assembly of display and dispensing modules capable of exemplary performance over an extended service life.

It is to be understood that the above detailed description of preferred embodiments of the invention is provided by way of example only. Various details of design, construction and procedure may be modified without departing from the true spirit and scope of the invention as set forth in the appended claims.

The embodiments of the invention in which an exclusive property or privilege is claimed are defined as follows:

1. A modular display and dispensing assembly in which low-voltage power is distributed from an external source of low-voltage power to a low-voltage electrical display feature at each of a plurality of display and dispensing modules assembled with one-another and arranged in a matrix upon a substrate for display of items to be dispensed, the modular display and dispensing assembly comprising:
   a first basal construct configured for being securely mounted to the substrate at a prescribed display and dispensing location on the substrate;
   first electrical contact points placed in a supply pattern within the first basal construct;
   a connector circuit for connecting the first electrical contact points to the source of low-voltage power,
   the plurality of display and dispensing modules being constructed and configured for selective arrangement in juxtaposition with one-another in the matrix of display and dispensing modules;
   a second basal construct configured for selective coupling to and uncoupling from the first basal construct, the second basal construct being configured for receiving the display and dispensing modules arranged in the matrix;
   a plurality of second electrical contact points placed in a distribution pattern within the second basal construct;
   a second connector circuit for connecting the distribution pattern of second electrical contact points to the supply pattern of first electrical contact points upon coupling the second basal construct with the first basal construct;
   third electrical contact points placed in a reception pattern in each display and dispensing module for contacting corresponding second electrical contact points of the distribution pattern upon arranging the matrix of display and dispensing modules upon the second basal construct;
   further electrical contact points placed in a further distribution pattern in each display and dispensing module;
   a further connector circuit in each display and dispensing module, each further connector circuit connecting the further electrical contact points with corresponding third electrical contact points; and
   at least one low-voltage electrical display feature carried by each display and dispensing module and connected to the further connector circuit, whereby selective coupling of the first basal construct with the second basal construct establishes distribution of low-voltage power to each display and dispensing module, while selective uncoupling of the second basal construct from the first basal construct facilitates ready removal of the matrix of display and dispensing modules received within the second basal construct from the substrate without disturbing the secure mounting of the first basal construct at the prescribed display and dispensing location, or a connection between the connector circuit and the source of low-voltage power.

2. The modular display and dispensing assembly of claim 1 wherein the low-voltage electrical display feature comprises illumination.

3. The modular display and dispensing assembly of claim 2 wherein the illumination comprises LEDs.

4. The modular display and dispensing assembly of claim 1 wherein the first basal construct comprises a sub-base and the second basal construct comprises a main base selectively movable into and out of coupling with the sub-base.

5. The modular display and dispensing assembly of claim 4 wherein the low-voltage electrical display feature comprises illumination.

6. The modular display and dispensing assembly of claim 5 wherein the illumination comprises LEDs.

7. The modular display and dispensing assembly of claim 1 including side panels arranged for mounting a side panel along each side of the matrix of display and dispensing modules, each side panel carrying a side panel low-voltage electrical display feature, and a side panel connector circuit for connecting the side panel low-voltage electrical display feature to a side panel connector circuit.

8. The modular display and dispensing assembly of claim 7 wherein the side panel low-voltage electrical display feature comprises illumination.

9. The modular display and dispensing assembly of claim 8 wherein the illumination comprises LEDs.

10. The modular display and dispensing assembly of claim 1 including a header arranged for mounting upon a module, the header carrying a header low-voltage electrical display feature and a header connector circuit for connecting the header electrical display feature to a header connector circuit.

11. The modular display and dispensing assembly of claim 10 wherein the header low-voltage electrical display feature comprises LEDs.

12. A method for distributing low-voltage power from a source of low-voltage power to a low-voltage electrical display feature at each of a plurality of display and dispensing modules assembled with one-another and arranged in a matrix upon a substrate for display of items to be dispensed, the method comprising:
   mounting a first basal construct secured to the substrate at a prescribed display and dispensing the location on the substrate;
   placing first electrical contact points in a supply pattern within the first basal construct;
   connecting the first electrical contact points to a source of low-voltage power;
   arranging a plurality of display and dispensing modules in juxtaposition with one-another in the matrix of display and dispensing modules;
   configuring a second basal construct for selective coupling to the first basal construct;
   receiving the display and dispensing modules within the second basal construct, arranged in the matrix;
   placing a plurality of second electrical contact points in a distribution pattern within the second basal construct;
   connecting the distribution pattern of second electrical contact points to the supply pattern of first electrical contact points upon coupling the second basal construct with the first basal construct;

placing third electrical contact points in a reception pattern in each display and dispensing module for contacting corresponding second electrical contact points upon arranging the matrix of display and dispensing modules upon the second basal construct;

placing further electrical contact points in a further distribution pattern in each display and dispensing module;

connecting the further electrical contact points with corresponding third electrical contact points in each display and dispensing module; and connecting at least one low-voltage electrical display feature carried by each display and dispensing module to the further connector circuit, whereby selective coupling of the first basal construct with the second basal construct establishes distribution of low-voltage power to each display and dispensing module, while selective uncoupling of the second basal construct from the first basal construct facilitates ready removal of the matrix of display and dispensing modules received in the second basal construct from the substrate without disturbing the secure mounting of the first basal construct at the prescribed display and dispensing location, or a connection between the connector circuit and the source of low-voltage power.

13. The method of claim 12 including providing the low-voltage electrical display feature in the form of illumination.

14. The method of claim 13 wherein the illumination is provided in the form of LEDs.

15. The method of claim 12 including mounting a side panel along each side of the matrix of display and dispensing modules, each side panel carrying a side panel low-voltage electrical display feature and a side panel connector circuit for connecting the side panel low-voltage electrical display feature to a side panel connector circuit.

16. The method of claim 15 including providing the side panel low-voltage electrical display feature in the form of side panel illumination.

17. The method of claim 16 wherein the side panel illumination is provided in the form of LEDs.

18. The method of claim 12 including mounting a header on a display and dispensing module, the header carrying a header low-voltage electrical display feature and a header connector arrangement for connecting the header low-voltage electrical display feature to a header connector circuit.

19. The method of claim 18 including providing the header low-voltage electrical display feature in the form of header illumination.

20. The method of claim 19 wherein the header illumination is provided in the form of LEDs.

* * * * *